United States Patent
Lu et al.

(10) Patent No.: US 7,251,412 B2
(45) Date of Patent: Jul. 31, 2007

(54) BACKLIGHT MODULES USING DIFFRACTION OPTICAL ELEMENTS

(75) Inventors: Ying-Tsung Lu, Kaohsiung (TW); Pong Lai, Tucheng (TW); Ching-Chin Wu, Taichung County (TW); Chang-Sheng Chu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/154,640

(22) Filed: Jun. 17, 2005

(65) Prior Publication Data

US 2006/0147152 A1    Jul. 6, 2006

(30) Foreign Application Priority Data

Dec. 30, 2004  (TW)  ............................. 93141351 A

(51) Int. Cl.
*G02B 6/34*  (2006.01)
*G02B 6/26*  (2006.01)
*G02B 6/42*  (2006.01)

(52) U.S. Cl. ........................................ 385/901; 385/37
(58) Field of Classification Search ................. 385/37, 385/901
See application file for complete search history.

(56) References Cited

U.S. PATENT DOCUMENTS

| 5,602,950 | A * | 2/1997 | Saitoh et al. ................. 385/46 |
| 5,748,828 | A * | 5/1998 | Steiner et al. ............... 385/146 |
| 5,799,124 | A * | 8/1998 | Zorn et al. ................... 385/125 |
| 5,841,596 | A * | 11/1998 | Perlo et al. .................. 359/859 |
| 5,943,166 | A * | 8/1999 | Hoshi et al. ................. 359/475 |
| 6,075,579 | A * | 6/2000 | Ueda et al. .................... 349/64 |
| 6,333,773 | B1 * | 12/2001 | Faris ........................... 349/176 |
| 6,384,883 | B1 * | 5/2002 | Ueda et al. .................. 349/112 |
| 6,426,812 | B2 * | 7/2002 | Ichikawa et al. .............. 359/22 |
| 6,679,621 | B2 | 1/2004 | West et al. |
| 6,785,433 | B2 * | 8/2004 | Tiefenthaler .................. 385/12 |
| 2002/0001109 | A1 * | 1/2002 | Hamano et al. ................ 359/9 |
| 2003/0235050 | A1 * | 12/2003 | West et al. ................... 362/327 |
| 2004/0021918 | A1 * | 2/2004 | Cameron et al. .............. 359/15 |
| 2004/0130879 | A1 * | 7/2004 | Choi et al. ..................... 362/31 |

* cited by examiner

*Primary Examiner*—Frank G. Font
*Assistant Examiner*—James P. Hughes
(74) *Attorney, Agent, or Firm*—Birch, Stewart, Kolasch & Birch, LLP

(57) ABSTRACT

Direct backlight modules using diffraction optical elements are provided. A direct backlight module includes a light source and a diffraction optical element, wherein the diffraction optical element is disposed above the light source. By properly arranging the phase function, the diffraction optical element can substantially modulate the wavefront of the light emitted from the light source and control light distribution as well as light direction.

9 Claims, 5 Drawing Sheets

BACKLIGHT MODULES USING DIFFRACTION OPTICAL ELEMENTS

BACKGROUND

The invention relates to backlight modules, and in particular to backlight modules having diffraction optical elements to control light distribution and light intensity of backlight modules.

Currently, in order to distribute light of conventional LED backlight modules, specially designed lens caps are provided. U.S. Pat. No. 6,679,621 B2 LUMILEDS discloses a side-emitting LED backlight module, wherein a special optical lens cap is disposed on the side-emitting LED backlight module to enforce the effect of uniformly emitting light. The curvature of the lens cap is, however, limited by process resolution. Thus, lens cap production is difficult and the lens cap is thicker. Accordingly, the thickness of the backlight module will increase dramatically. Additionally, in the conventional direct backlight modules, the light emitted from the light source travels forward through the transparent plate to the diffuser and then uniformly distributes on the liquid crystal display via the diffuser. However, due to the insufficient penetrability of the transparent plate and the consideration of the uniform light distribution, the thickness of the backlight module cannot be reduced due to multilayer arrangement.

SUMMARY

Direct backlight modules using diffraction optical elements are provided. An exemplary embodiment of a direct backlight module includes a light source and a diffraction optical element, wherein the diffraction optical element is disposed above the light source. By properly arranging the phase function, the diffraction optical element can substantially modulate the wavefront of the light emitted from the light source and control the light distribution as well as the light direction.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 3 is a diagram of an image plane A in FIG. 1a;

FIG. 4 is a diagram of an objective plane in FIG. 1a; and

DETAILED DESCRIPTION

Figure 1A:
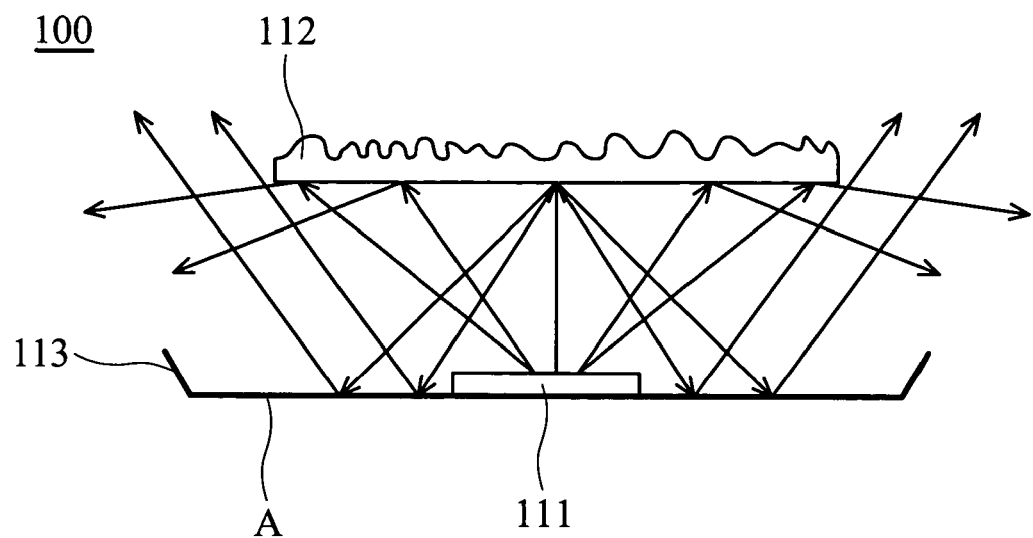
FIG. 1a shows a side view of an embodiment of a backlight module.
Figure 2:
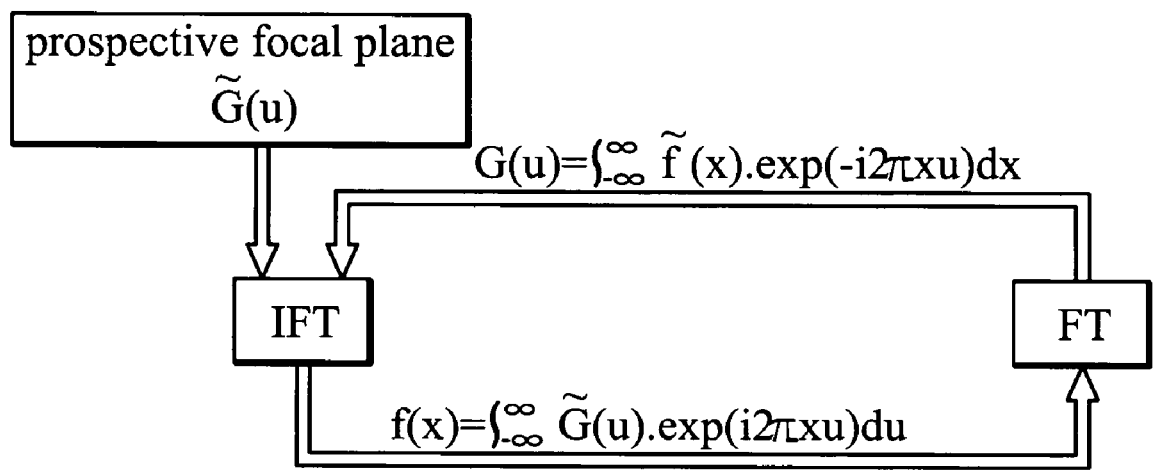
FIG. 2 shows a transformation flowchart of the object plane wavefront function.
Figure 3:
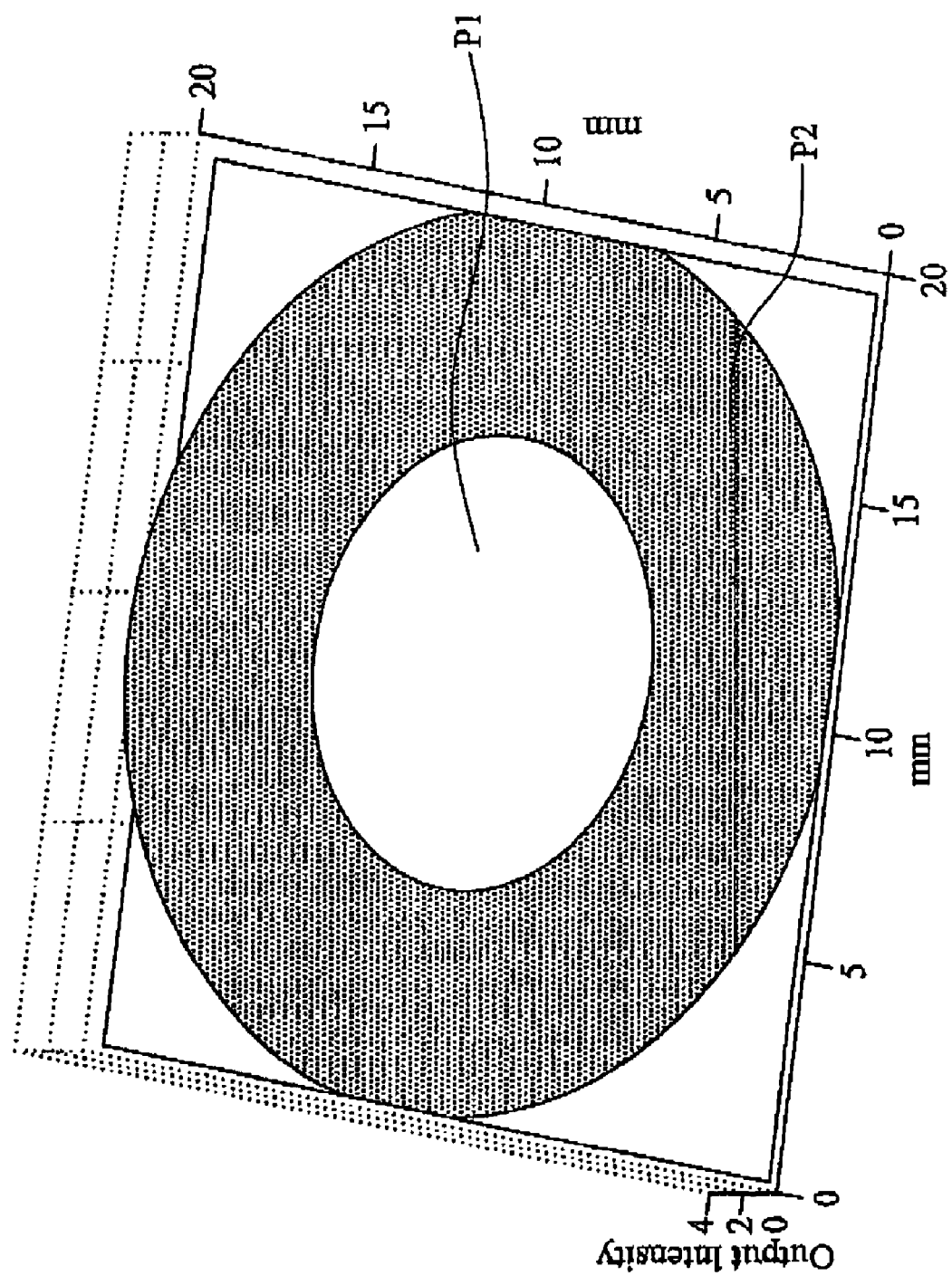
Figure 4:
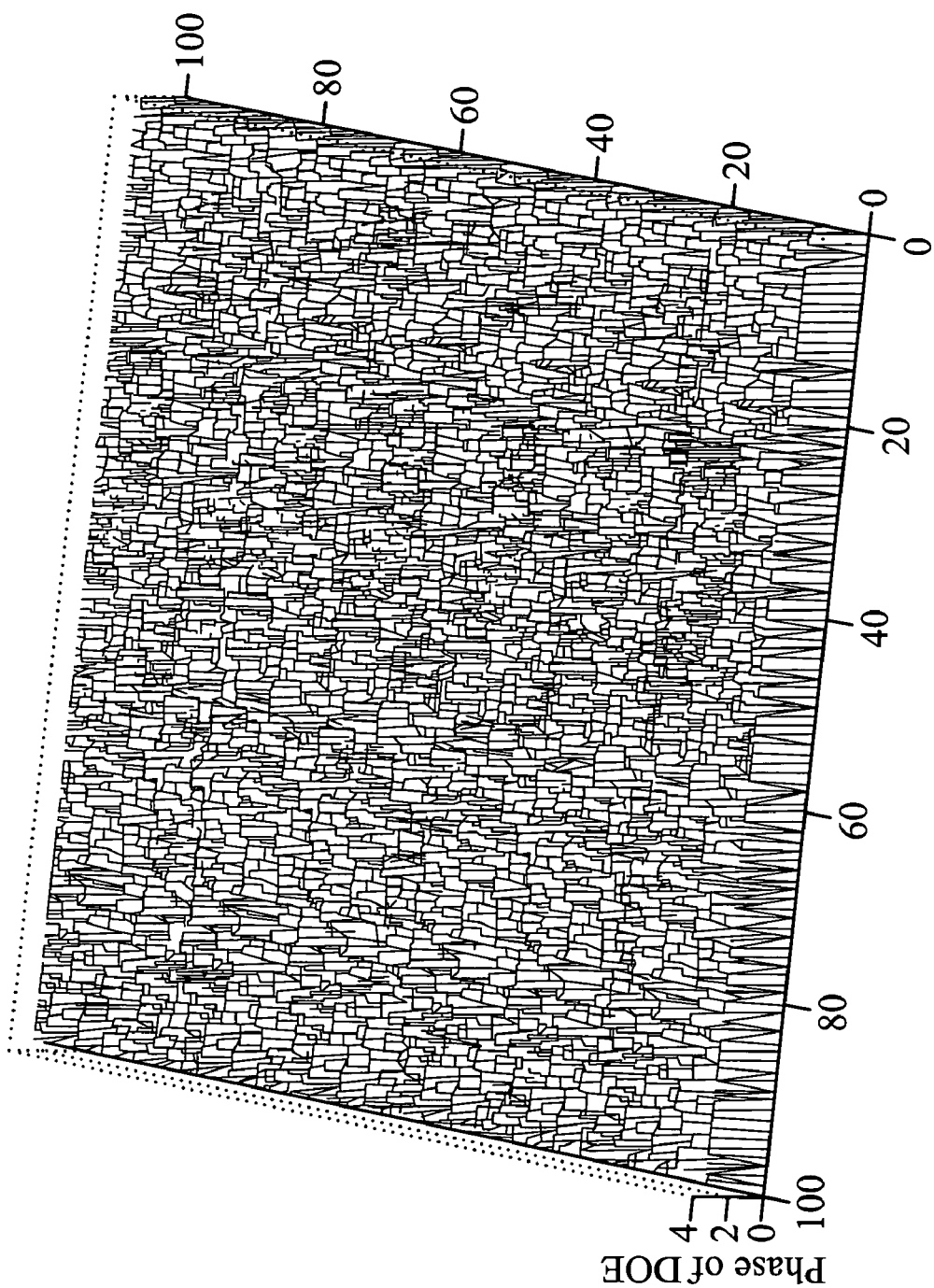

Direct backlight modules will be described in greater detail in the following. Please refer to FIG. 1a. FIG. 1a shows a side view of an embodiment of a backlight module. In this embodiment, a direct backlight module 100 comprises a liquid crystal display (not shown), a light source 111, a reflective plate 113, and a diffraction optical element 112, wherein the diffraction optical element 112 is disposed above the light source 111. By properly arranging the phase function, the diffraction optical element 112 may substantially modulate the wavefront of the light emitting from the light source 111 and control the light distribution as well as the light direction to form an expected image plane A (shown in FIG. 3). Additionally, the light source 111 is LED(light-emitting diode), fluorescent lamps, laser diode or other light sources. In this embodiment, the diffraction optical element 112 is a reflection diffraction optical element conducted to reflect light emitted from the light source 111 to form the expected image plane A. Referring next to FIG. 3 & 4, FIG. 3 shows a light distribution of the image plane A set in a manner eliminating zero-order light. According to the phase function of the light distribution, the corresponding phase function of the objective plane, as shown in FIG. 4, can be derived from IFT (Inverse Fourier Transform shown in FIG. 2). The diffraction optical element 112 can then be produced in accordance with the phase function of the objective plane. As mentioned before, this embodiment discloses a reflective light distribution and the LED light source 111 emits light modulated by the diffraction optical element 112 to form light distribution, as shown in FIG. 3. The light distribution comprises a first portion P1, corresponding to the light source 111, and a second portion P2, the annular light distribution. The first portion P1 eliminates light from the light source 111 to pass through (referring to FIG. 1), and the second portion is pervious to light. Additionally, the second portion, the annular light distribution can prohibit the light from being reflected on the light source 111 so that the device may not be overheated. Furthermore, the thickness of the backlight module can be decreased. The production steps of the diffraction optical element 112 will be described hereafter.

Figure 1B:
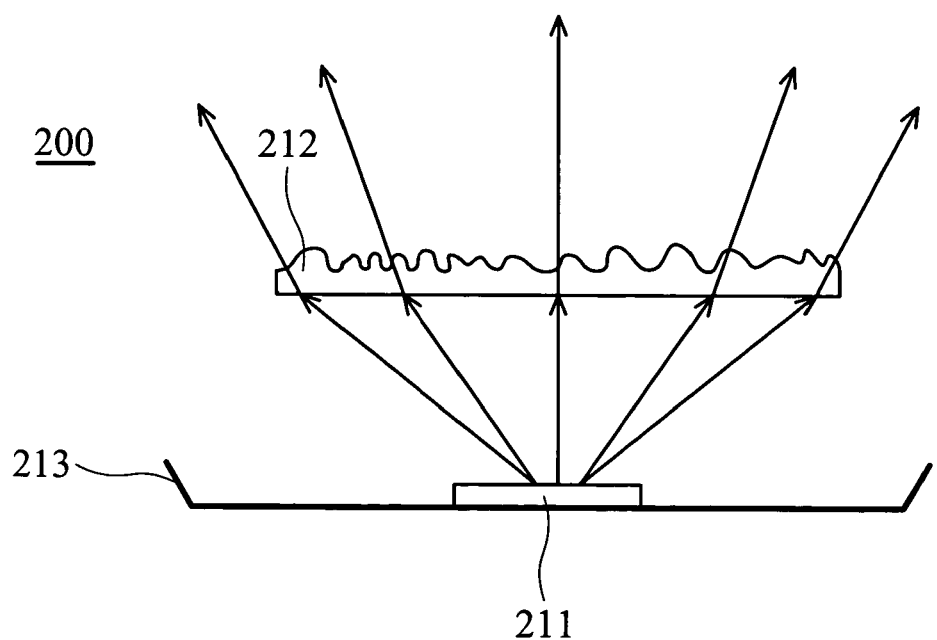
FIG. 1b shows a side view of another embodiment of a backlight module.

Please refer to FIG. 1b. FIG. 1b shows another embodiment of the invention. As shown in FIG. 1b, a direct backlight module 200 comprises a liquid crystal display(not shown), a light source 211, a reflective plate 213, and a diffraction optical element 212, wherein the light source 211 is a LED(light-emitting diode), fluorescent lamp, laser diode or other light source. In this embodiment, the diffraction optical element 212 is a transparent diffraction optical element, but may be a reflective diffraction optical element or a refractive diffraction optical element such as hybrid lens. The diffraction optical element 212 is introduced to utilize the transmission light to form an expected image plane. For example, to make the brightness uniform, a uniformly planar light distribution is considerably important. Accordingly, a uniform phase function of light distribution of the image plane is first set. According to the phase function of the light distribution, the corresponding phase function of the objective plane can then be derived from IFT(Inverse Fourier Transform shown in FIG. 2). The diffraction optical element 212 can then be produced in accordance with the phase function of the objective plane. Similarly, the production steps of the diffraction optical element 212 will be described hereafter.

In practice, the diffraction optical element of the invention may be applied to side-emitting backlight modules. By utilizing the reflective diffraction optical element, the light emitted from the light source can form a required light distribution and then be reflected on the liquid crystal display. In other words, the reflective diffraction optical element displaces conventional reflection plates and also provides optimized light.

Figure 5:
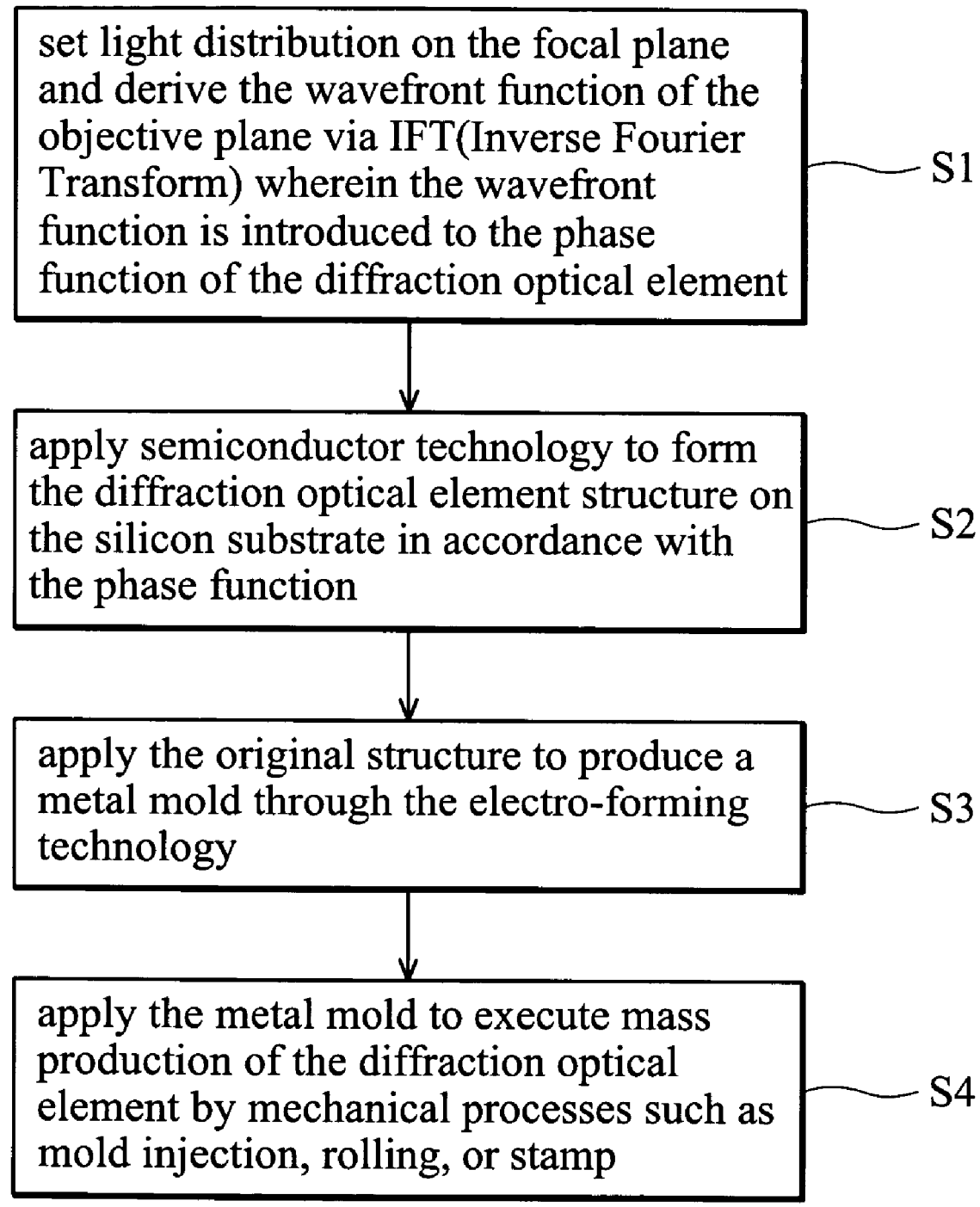
FIG. 5 shows a production flowchart of a diffraction optical element.

As shown in FIG. 5, FIG. 5 shows a production flowchart of the diffraction optical element of the invention. The production steps of the diffraction optical element are as follows:

Step S1, set light distribution on the image plane and carry out simulation related to required light diffusion, uniformity, and brightness. Further, the final wavefront function is derived from the wavefront function of the objective plane via IFT(Inverse Fourier Transform). Accordingly, the final wavefront function is introduced to the phase function of the diffraction optical element; step S2, transform the phase function into a mask layout, apply the lithography to form a resist layer on a wafer or silica substrate, and etch the wafer or silica substrate to form an original structure; step S3, apply the original structure to produce a metal mold through the electro-forming technology; final step S4, apply the metal mold to execute mass production of the diffraction optical element by mechanical processes such as mold injection, rolling, or stamp. Additionally, the diffraction optical element may comprise plastic, metal, or other suitable materials.

As previously described, the invention provides a backlight module with a diffraction optical element, wherein the diffraction optical element can provide programmable and optimized light distribution and also increase the brightness of liquid crystal display.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a light source; and
   a diffraction optical element disposed above the light source comprising a computer generated hologram modulating light to form a light distribution, wherein the light distribution comprises a first portion, corresponding to the light source and eliminating light, and a second portion, pervious to light.

2. The backlight module as claimed in claim 1, wherein the light source is a light-emitting diode, fluorescent lamp, laser diode.

3. The backlight module as claimed in claim 1, wherein the diffraction optical element is a transparent diffraction optical element, or a reflective diffraction optical element.

4. The backlight module as claimed in claim 1, wherein the computer generated hologram modulates the light direction and the light phase distribution.

5. The backlight module as claimed in claim 1, wherein the diffraction optical element comprises plastic, silica, or metal.

6. The backlight module as claimed in claim 1, wherein the diffraction optical element is made by injection molding, rolling, or stamping process.

7. The backlight module as claimed in claim 1, wherein the diffraction optical element can be combined with, or formed on a refraction optical element.

8. The backlight module as claimed in claim 1, wherein the first portion is within the second portion.

9. The backlight module as claimed in claim 1, wherein the second portion is annular.

* * * * *